United States Patent
Farhadi et al.

(10) Patent No.: US 12,079,727 B2
(45) Date of Patent: Sep. 3, 2024

(54) BUTTERFLY TRANSFORM LAYER

(71) Applicant: APPLE INC., Cupertino, CA (US)

(72) Inventors: Ali Farhadi, Seattle, WA (US); Mohammad Rastegari, Bothell, WA (US); Keivan Alizadeh Vahid, Seattle, WA (US)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 16/892,192

(22) Filed: Jun. 3, 2020

(65) Prior Publication Data

US 2020/0387776 A1 Dec. 10, 2020

Related U.S. Application Data

(60) Provisional application No. 62/857,003, filed on Jun. 4, 2019.

(51) Int. Cl.
| | |
|---|---|
| *G06N 3/084* | (2023.01) |
| *G06F 17/14* | (2006.01) |
| *G06N 3/02* | (2006.01) |
| *G06N 3/04* | (2023.01) |
| *G06N 3/048* | (2023.01) |
| *G06N 3/082* | (2023.01) |

(52) U.S. Cl.
CPC ........... *G06N 3/084* (2013.01); *G06F 17/142* (2013.01); *G06N 3/02* (2013.01); *G06N 3/04* (2013.01); *G06N 3/048* (2023.01); *G06N 3/082* (2013.01)

(58) Field of Classification Search
CPC .......... G06N 3/04; G06N 3/02; G06N 3/0481; G06N 3/082; G06N 3/084; G06F 17/142
USPC .......................................................... 706/27
See application file for complete search history.

(56) References Cited

U.S. PATENT DOCUMENTS

| | | | |
|---|---|---|---|
| 11,228,767 B2 * | 1/2022 | Hannuksela | H04N 19/159 |
| 2018/0089562 A1 * | 3/2018 | Jin | G06N 3/063 |
| 2021/0027140 A1 * | 1/2021 | Chollet | G06V 40/169 |

OTHER PUBLICATIONS

Li, et al., "Butterfly-Net: Optimal Functional Representation Based on Convolutional Neural Networks", arXiv: 1805.07451v1 [math. NA] May 18, 2018 (Year: 2018).*

* cited by examiner

*Primary Examiner* — Tsu-Chang Lee
(74) *Attorney, Agent, or Firm* — BAKERHOSTETLER

(57) ABSTRACT

Input data having multiple channels may be received and passed through a convolutional neural network model to generate output data. Passing the input data through the convolutional neural network model may include passing the input data through a depth-wise convolutional layer configured to perform a convolution on the input data for each channel of the input data to generate first data. The first data is passed from the depth-wise convolutional layer through a butterfly transform layer comprising multiple sub-layers configured to perform a linear transformation of the first data to fuse the channels of the first data and generate second data, wherein the output data is based on the generated second data. The output data may be provided for further processing on a computing device.

20 Claims, 5 Drawing Sheets ns to specific details set forth herein and can be practiced using one or more other implementations. In one or more implementations, structures and components are shown in block diagram form in order to avoid obscuring the concepts of the subject technology.

BUTTERFLY TRANSFORM LAYER

CROSS-REFERENCE TO RELATED APPLICATIONS

This application claims the benefit of U.S. Provisional Application No. 62/857,003, titled "BUTTERFLY TRANSFORM: AN EFFICIENT FFT BASED NEURAL ARCHITECTURE DESIGN" and filed on Jun. 4, 2019, which is hereby incorporated by reference herein for all purposes.

TECHNICAL FIELD

The present description generally relates to neural networks and more particularly to the architecture of convolutional neural networks.

BACKGROUND

Convolutional neural networks (CNNs) are being trained for a wide variety of tasks. However, the computational complexity of a CNN may challenge resource-constrained edge devices trying to use the CNN. Efforts to make CNNs run more efficiently, such as factorizing convolutional layers, still present a challenging level of computational complexity.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
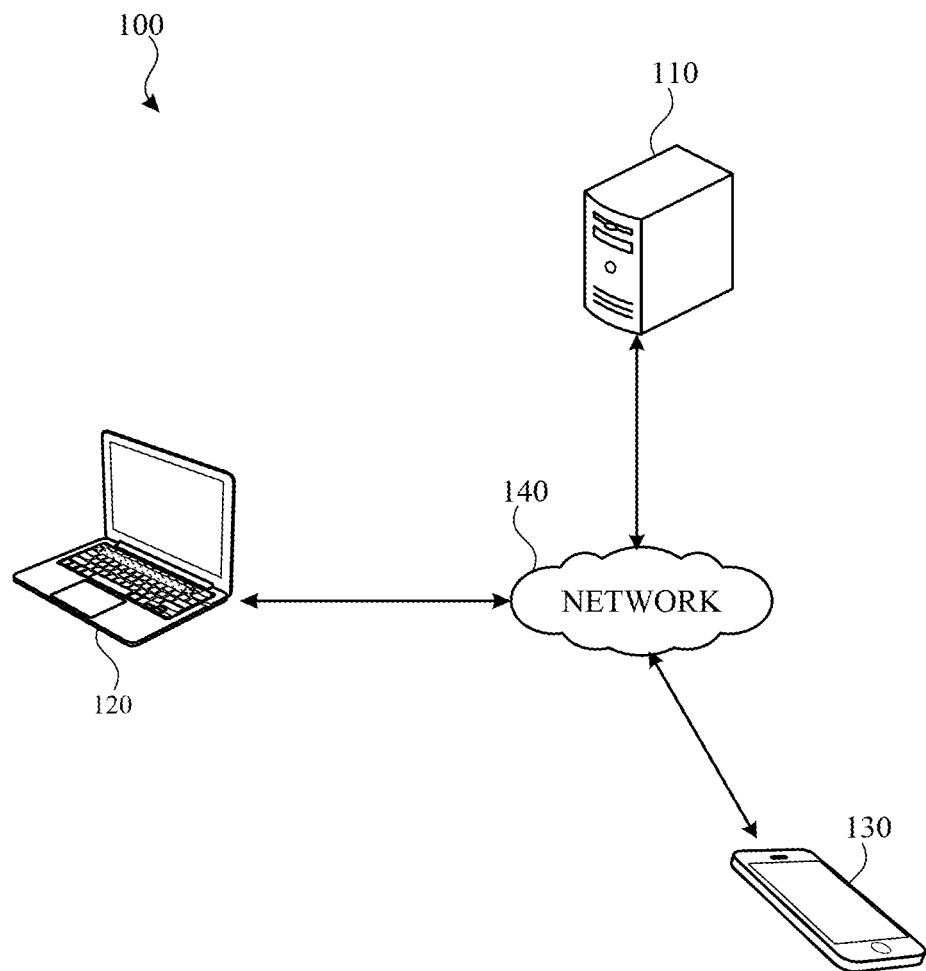
FIG. 1 illustrates an example network environment according to aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides a light-weight channel fusion layer for use in convolutional neural network (CNN) models. The computational complexity of a convolutional layer may be reduced by factorizing the convolutional layer using a separable depth-wise convolution, which splits the convolution into two components. The first component executes spatial fusion where each spatial channel of input data is convolved independently using a depth-wise convolution. The second component executes channel fusion where the spatial channels are linearly combined using 1×1 convolutions known as point-wise convolutions. However, the computational complexity of the point-wise convolutions used in this channel fusion is quadratic in the number of channels in the input data ($\mathcal{O}(n^2)$, where n is the number of channels), and therefore still relatively high. The subject technology proposes to replace the high-complexity point-wise convolutional layer with a light-weight channel fusion layer called a butterfly transform (BFT) layer having a lower computational complexity ($\mathcal{O}(n \log(n))$).

The BFT layer fuses the channels using log(n) sub-layers, with $\mathcal{O}(n)$ operations performed at each sub-layer. The network structure of the BFT layer is based on the butterfly operations used in the Fast Fourier Transform (FFT) algorithm, which have been optimized in a number of hardware/software platforms. The butterfly operations include operations that generate two outputs from two inputs which, when diagrammed, form an hourglass or butterfly shape. The network structure of the BFT layer may be configured to have at least one path between every input channel and all of the output channels, which enables cross talk across channels during fusion and facilitates input nodes receiving crucial signals during back propagation while training the CNN model. The BFT layer also may be configured to maximize the bottleneck size, which represents the minimum number of nodes in the network that, if removed, would cut off information flow from the input channels to the output channels. The BFT layer may reduce the computational complexity by reducing the number of edges in the network structure relative to that in point-wise convolutional layer structures. In addition, the nodes in each sub-layer of the BFT layer may having the same out degree. The BFT is described in more detail below.

According to aspects of the subject technology, input data comprising a plurality of channels may be received and passed through a convolutional neural network model to generate output data. Passing the input data through the convolutional neural network model may include passing the input data through a depth-wise convolutional layer configured to perform a convolution on the input data for each channel of the input data to generate first data. The first data is passed from the depth-wise convolutional layer through a butterfly transform layer comprising a plurality of sub-layers configured to perform a linear transformation of the first data to fuse the channels of the first data and generate second data, wherein the output data is based on the generated second data. The output data may be provided for further processing on a computing device.

The plurality of sub-layers may be configured to recursively calculate the second data. The number of input nodes and the number of output nodes for each of the sub-layers may be equal in number and the nodes within each sub-layer may have the same out degree. The butterfly transform layer may include a path between each input node of a first sub-layer of the plurality of sub-layers that receives the first data and each output node of a second sub-layer of the plurality of sub-layers that outputs the second data. The butterfly transform layer may be configured to execute a non-linearity function on the generated second data. The butterfly transform layer may be configured to execute a batch normalization of the generated second data. The plurality of sub-layers may include log(n) sub-layers, wherein n is the number of channels of the input data.

Replacing point-wise convolutional layers with BFT layers to perform channel fusion reduces the computational complexity of the channel fusion, thereby reducing computing resources needed to implement CNN models incorporating the BFT layers. The reduced computational complexity may result in lower memory requirements for storing the CNN models. The reduced computational complexity may reduce the processing power needed to execute the CNN models thereby enabling lower-power computing devices to effectively execute CNN models that might not be possible if point-wise convolutional layers were used. Alternatively, the reduced computational complexity may facility higher accuracy in the output of the CNN models using similar numbers of floating point operations (FLOPs) as might be used when point-wise convolution layers are used in the CNN models.

FIG. 1 illustrates an example network environment 100 according to aspects of the subject technology. Not all of the depicted components may be used in all implementations, however, and one or more implementations may include additional or different components than those shown in the figure. Variations in the arrangement and type of the components may be made without departing from the scope of the claims as set forth herein. Additional components, different components, or fewer components may be provided.

The network environment 100 includes server 110, computing device 120, and computing device 130. Network 140 may communicatively (directly or indirectly) couple server 110 and computing devices 120 and 130. Network 140 is not limited to any particular type of network, network topology, or network media. Network 140 may be a local area network or a wide area network. Network 140 may be an interconnected network of devices that may include, or may be communicatively coupled to, the Internet. For explanatory purposes, the network environment 100 is illustrated in FIG. 1 as including the server 110 and the computing devices 120 and 130. However, the network environment 100 may include any number of electronic devices and any number of servers. Computing device 120 is depicted as a laptop computer and computing device 130 is depicted as a smartphone. The subject technology is not limited to these types of computing devices. Server 110 and computing devices 120 and 130 may include all or part of the components of the system described below with respect to FIG. 5.

Server 110 may provide a system for configuring and training convolutional neural networks using BFTs according to the techniques described herein. Server 110 may deploy the trained neural networks to computing devices 120 or 130 for application of the trained neural network on trained tasks. The deployment may be via network 140 or through other transfer mechanisms. The configuration and training of convolutional neural networks using BFTs is not limited to being performed on server 110 and also may be performed by computing devices 120 and/or 130.

Figure 2:
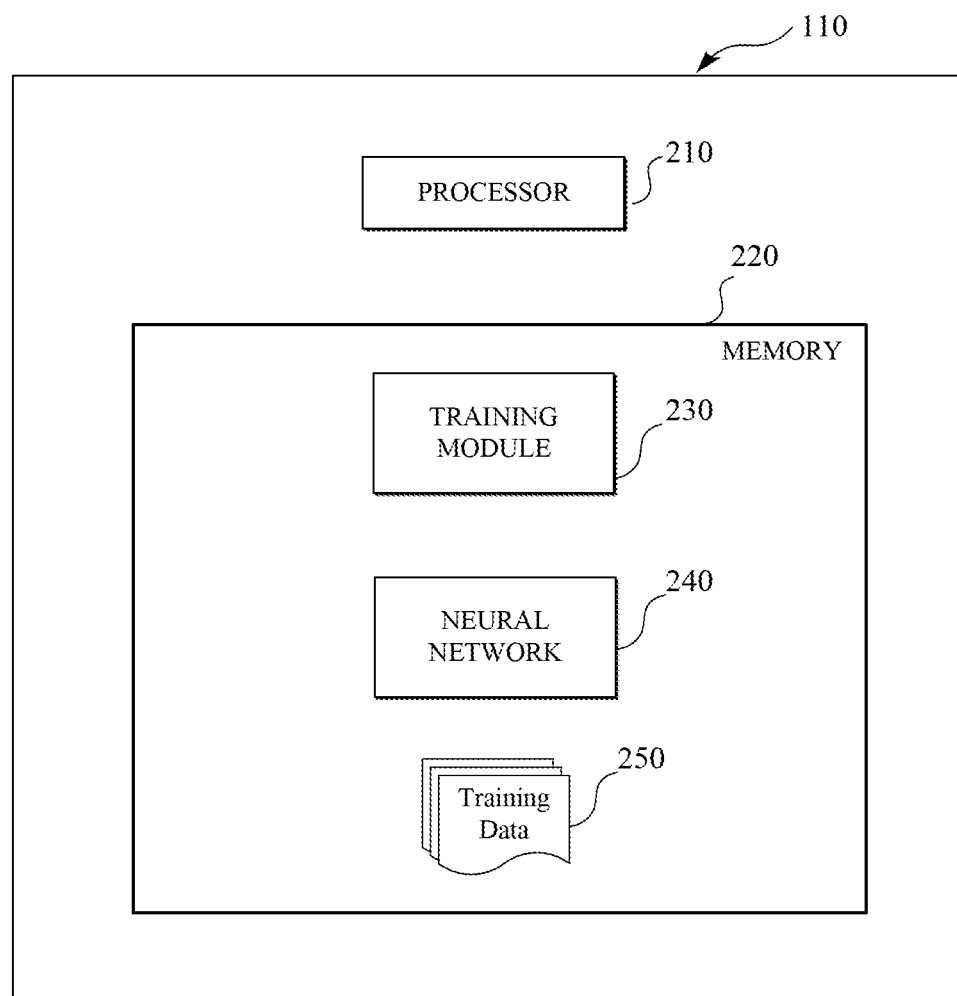
FIG. 2 illustrates an example computing architecture for a system providing configuration and training of a CNN model according to aspects of the subject technology.

FIG. 2 is a block diagram illustrating components of server 110 used in configuring and training convolutional neural networks according to aspects of the subject technology. While the components are being described as being part of server 110, some or all of the components may be implemented on other systems such as computing devices 120 and 130. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, server 110 includes processor 210 and memory 220. Examples of processor 210 and memory 220 are provided below in connection with FIG. 5. Memory 220 may contain training module 230, neural network 240, and training data 250. Training module 230 represents code comprising one or more sequences of instructions executable by processor 210 to implement the convolutional neural network configuration and training processes described herein. Neural network model 240 represents convolutional neural network models that may be trained by training module 230. The subject technology is not limited to any particular types of convolutional neural networks. Training data 250 represent labeled data sets are curated for different types of tasks for which neural network 240 may be trained. For example, the training data may include images, text, audio, or video files.

As noted above, point-wise convolutional layers have relatively high computational complexity and therefore present computational bottlenecks in CNNs. A point-wise convolutional layer receives as input a data tensor X having a size $n_{in} \times h \times w$, where $n_{in}$ is the number of input channels and h and w represent the height and width, respectively, of the data. The point-wise convolutional layer applies a weight tensor W having a size of $n_{out} \times n_{in} \times h \times w$, where $n_{out}$ is the number of output channels, to generate an output tensor Y having a size $n_{out} \times h \times w$. The convolution performed by the point-wise convolutional layer may be defined as a function $\mathcal{P}$ where $Y = \mathcal{P}(X; W)$.

Function $\mathcal{P}$ may be written as a matrix product $\hat{Y} = \hat{W}\hat{X}$ by reshaping the input tensor X into a two-dimensional matrix $\hat{X}$ having a size $n \times (hw)$, where each column vector in $\hat{X}$ corresponds to a spatial vector $X[:, i, j]$, and reshaping the weight tensor into a two-dimensional matrix $\hat{W}$ having a size $n \times n$ (for purposes of this example we are assuming $n_{in} = n_{out} = n$). $\hat{Y}$ represents the matrix representation of the output tensor Y. This matrix product can be seen as a linear transformation of the vectors in the columns of $\hat{X}$ using $\hat{W}$ as a transformation matrix.

The linear transformation is a matrix-vector product having a computational complexity of $\mathcal{O}(n^2)$. The computational complexity of the linear transformation can be reduced by structuring the transformation matrix to comply with certain characteristics ideal to a fusion network. These characteristics include every-to-all connectivity where there is at least path between every input channel and all of the output channels. The fusion network should have a maximum bottleneck size where the bottleneck size represents the minimum number of nodes in the network that, if removed, would completely cut off information flow from the input channels to the output channels. In addition, the network should have as few edges as possible to reduce computations and the nodes in each layer should have the same out degree to enable efficient matrix implementation of the fusion network.

The BFT of the subject technology implements a fusion network exhibiting the characteristics outlined above using a butterfly matrix $B^{(n,k)}$ of order n and base k where $B^{(n,k)} \in \mathbb{R}^{n \times n}$. The butterfly matrix is defined as:

$$B^{(n,k)} = \begin{pmatrix} M_1^{(\frac{n}{k},k)} D_{11} & \cdots & M_1^{(\frac{n}{k},k)} D_{1k} \\ \vdots & \ddots & \vdots \\ M_k^{(\frac{n}{k},k)} D_{k1} & \cdots & M_k^{(\frac{n}{k},k)} D_{kk} \end{pmatrix} \quad (1)$$

where $$M_i^{(\frac{n}{k},k)}$$

are butterfly matrices of order $$\frac{n}{k}$$

and base k and $D_{ij}$ is an arbitrary diagonal $$\frac{n}{k} \times \frac{n}{k}$$

matrix.

The matrix-vector product between a butterfly matrix $B^{(n,k)}$ and a vector $x \in \mathbb{R}^n$ is:

$$B^{(n,k)} x = \begin{pmatrix} M_1^{(\frac{n}{k},k)} D_{11} & \cdots & M_1^{(\frac{n}{k},k)} D_{1k} \\ \vdots & \ddots & \vdots \\ M_k^{(\frac{n}{k},k)} D_{k1} & \cdots & M_k^{(\frac{n}{k},k)} D_{kk} \end{pmatrix} \begin{pmatrix} x_1 \\ \vdots \\ x_k \end{pmatrix} \quad (2)$$

where $$x_i \in \mathbb{R}^{\frac{n}{k}}$$

is a subsection of x formed by dividing x into k equal-sized vectors. The matrix-vector product can be simplified by factoring out $$M_i^{(\frac{n}{k},k)}$$

to produce:

$$B^{(n,k)} x = \begin{pmatrix} M_1^{(\frac{n}{k},k)} \sum_{j=1}^{k} D_{1j} x_j \\ \vdots \\ M_i^{(\frac{n}{k},k)} \sum_{j=1}^{k} D_{ij} x_j \\ \vdots \\ M_k^{(\frac{n}{k},k)} \sum_{j=1}^{k} D_{kj} x_j \end{pmatrix} = \begin{pmatrix} M_1^{(\frac{n}{k},k)} y_1 \\ \vdots \\ M_i^{(\frac{n}{k},k)} y_i \\ \vdots \\ M_k^{(\frac{n}{k},k)} y_k \end{pmatrix} \quad (3)$$

where $y_i = \Sigma_{j=1}^{k} D_{ij} x_j$. In the simplification, $$M_i^{(\frac{n}{k},k)}$$

$y_i$ is a smaller matrix-vector product between a butterfly matrix of order $$\frac{n}{2}$$

and a vector of size $$\frac{n}{2}.$$

Accordingly, the matrix-vector product $B^{(n,k)} x$ can be determined using a divide-and-conquer algorithm where the matrix-vector product is recursively broken down into smaller matrix-vector products. This is illustrated in the Recursive Butterfly Transform Algorithm presented below for a butterfly matrix $B^{(n,k)}$ having a base k=2.

| Recursive Butterfly Transform Algorithm |
| --- |
| 1:     Function ButterflyTransform(W, X, n): |
|         Data: W |
|         Weights containing 2nlog(n) numbers |
|         Data: X |
|         Input containing n numbers |
| 2:     if n==1 then |
| 3:         return [X] |
| 4:     Make $D_{11}, D_{12}, D_{21}, D_{22}$ using 2n numbers of W; |
| 5:     Split rest 2n(log(n) − 1) numbers into two sequences $W_1, W_2$ with length n(log(n) −1) each; |
| 6:     Split X into $X_1, X_2$ |
| 7:     y1 ← $D_{11} X_1 + D_{12} X_2$ |
| 8:     y2 ← $D_{21} X_1 + D_{22} X_2$ |
| 9:     $My_1$ ← ButterflyTransform($W_1, y_1, n − 1$) |
| 10:    $My_2$ ← ButterflyTransform($W_2, y_2, n − 1$) |
| 11:    return Concat($My_1, My_2$) |

The computational complexity of the matrix-vector product between a butterfly matrix $B^{(n,k)}$ and an n-dimensional vector can be represented as T(n, k). Based on Equation (3) above, the matrix-vector product can be calculated with k matrix-vector products of butterfly matrices of order $$\frac{n}{2},$$

which results in a computational complexity of k $$T\left(\frac{n}{k}, k\right).$$

Calculating $y_i$ for all $i \in \{1, \ldots, k\}$ is $\mathcal{O}$ (kn). Therefore the computational complexity based on Equation (3) is $$T(n, k) = k T\left(\frac{n}{k}, k\right) + \mathcal{O}(kn),$$

which can be represented as T(n,k)=$\mathcal{O}$(k(n log$_k$ n)). A smaller value for k, where 2≤k≤n, lowers the computational complexity of the matrix-vector product.

Figures 3A, 3B:
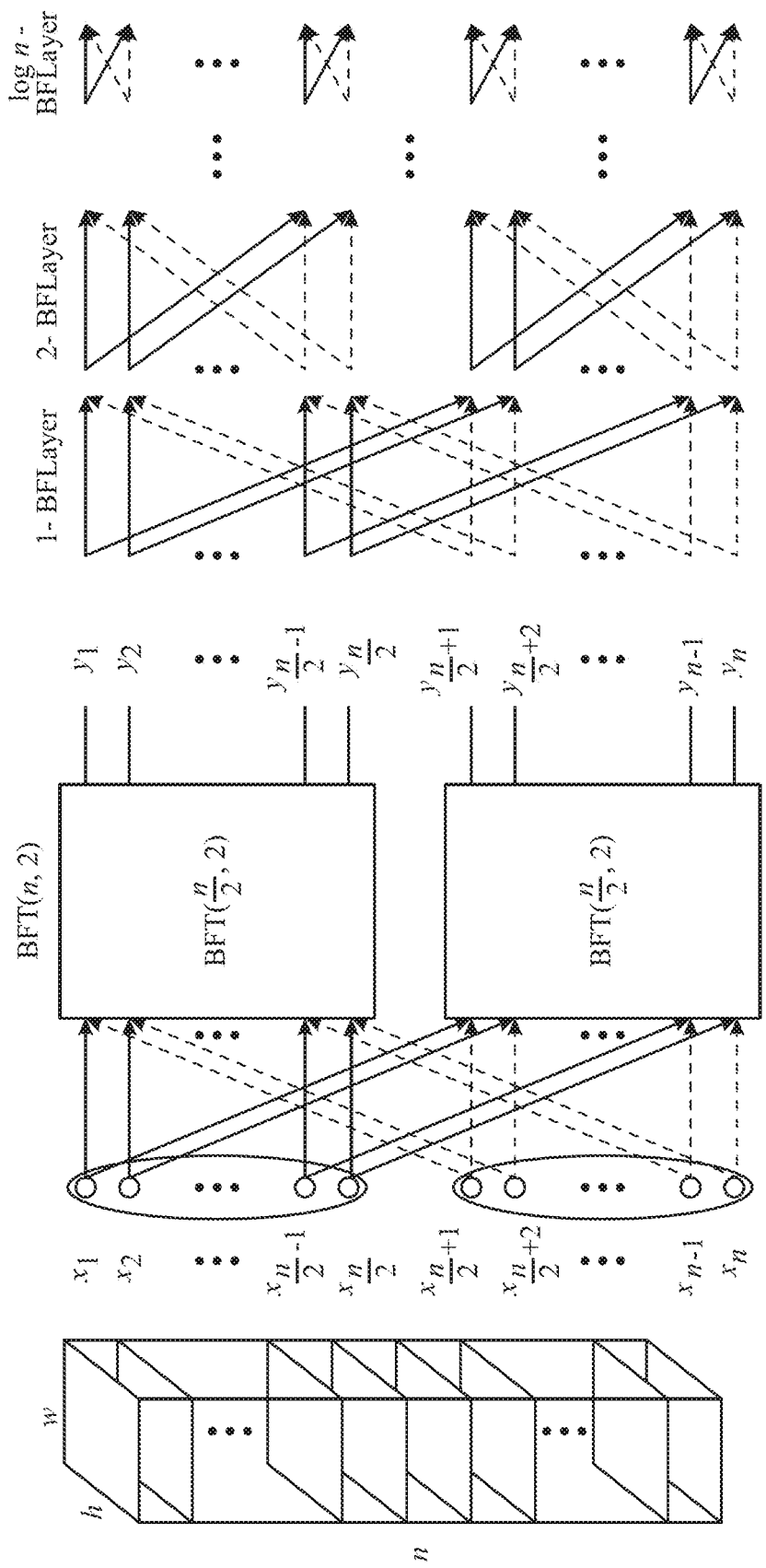
FIGS. 3A and 3B are diagrams depicting butterfly transform layer structures according to aspects of the subject technology.

One specific case of the BFT described above is the Discrete Fourier Transform (DFT). Specifically, the DFT is a butterfly transform with a base of 2 such that the elements of the transform matrix $B^{(n,2)} \in \mathbb{C}^{n \times n}$. With the DFT, the elements of the output vector are permuted by radix-2 shuffle and the diagonal elements of the $D_{ij}$ are drawn from the $n^{th}$ root of unity $z^n=1$ where $z \in \mathbb{C}$. Therefore, the Fast Fourier Transform (FFT) is a specific case of the BFT have an order n and a base of 2. The subject technology utilizes a graph similar to the FFTs graph to define the network architecture of the BFT layer. For example, FIG. 3A is a diagram illustrating a BFT layer having a base k=2 through which an input tensor having a size of n×h×w is passed. FIG. 3B is a diagram illustrating the BFT layer with the log n sub-layers expanded out using a graph similar to an FFT graph. The arrows shown in FIG. 3B represent the edges connecting nodes within the BFT layer. The weights and configuration of the edges and nodes are provided by the butterfly transform matrix $B^{(n,2)}$. The elements of the matrix are learned during the training of the CNN containing the BFT layer. A CNN model may replace all or a portion of the instances of point-wise convolutional layers contained in the CNN model architecture with BFT layers described above.

A BFT layer may be augmented with batch normalization and/or non-linearity functions such as ReLU and Sigmoid. Batch normalization and/or non-linearity functions may be applied to the outputs of each sub-layer within the BFT layer. However, batch normalization increases the computational complexity and may be applied only at the end of the BFT. Non-linearity functions may zero out too many values in the sub-layers destroying information during forward propagation. Accordingly, non-linearity functions also may be applied on at the end of the BFT.

Figure 4:
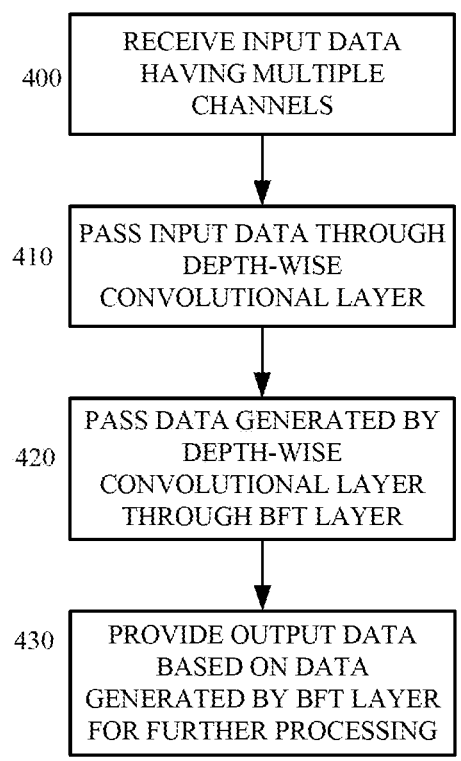
FIG. 4 is a flowchart illustrating a process for utilizing a butterfly transform layer within a CNN model according to aspects of the subject technology.

FIG. 4 is a flowchart illustrating a process of using a BFT layer during the operation of a CNN according to aspects of the subject technology. For explanatory purposes, the blocks of the process are described herein as occurring in serial, or linearly. However, multiple blocks of the process may occur in parallel. In addition, the blocks of the process need not be performed in the order shown and/or one or more blocks of the process need not be performed and/or can be replaced by other operations.

Input data having multiple channels may be received an input to a CNN or as input to a layer within the CNN (block 400). The input data is passed through a depth-wise convolutional layer to perform a convolution for each channel of the input data (block 410). The data generated by the depth-wise convolutional layer is then passed through a BFT layer to fuse the channels of the data (block 420). As discussed above, the BFT layer performs a light-weight channel fusion using a butterfly matrix to perform a linear transformation of the data received from the depth-wise convolutional layer. The data generated by the BFT layer is provided either to a subsequent layer in the CNN or as output data from the CNN. This output data may be provided for storage on a disc or other storage media for further processing by a computing device (block 430).

The BFT described herein provides an optimal structure for a channel fusion layer. For example, the network may be configured to have exactly one path between every input channel to all of the output channels. The degree of each node in the graph structure is k, the bottleneck size may be a maximum n, and the number of edges may be $\mathcal{O}$(n log(n)).

As the structure of the BFT network layer mimics that of an FFT graph, hardware and/or software optimized for FFTs may be used to implement a BFT layer within a CNN.

Figure 5:
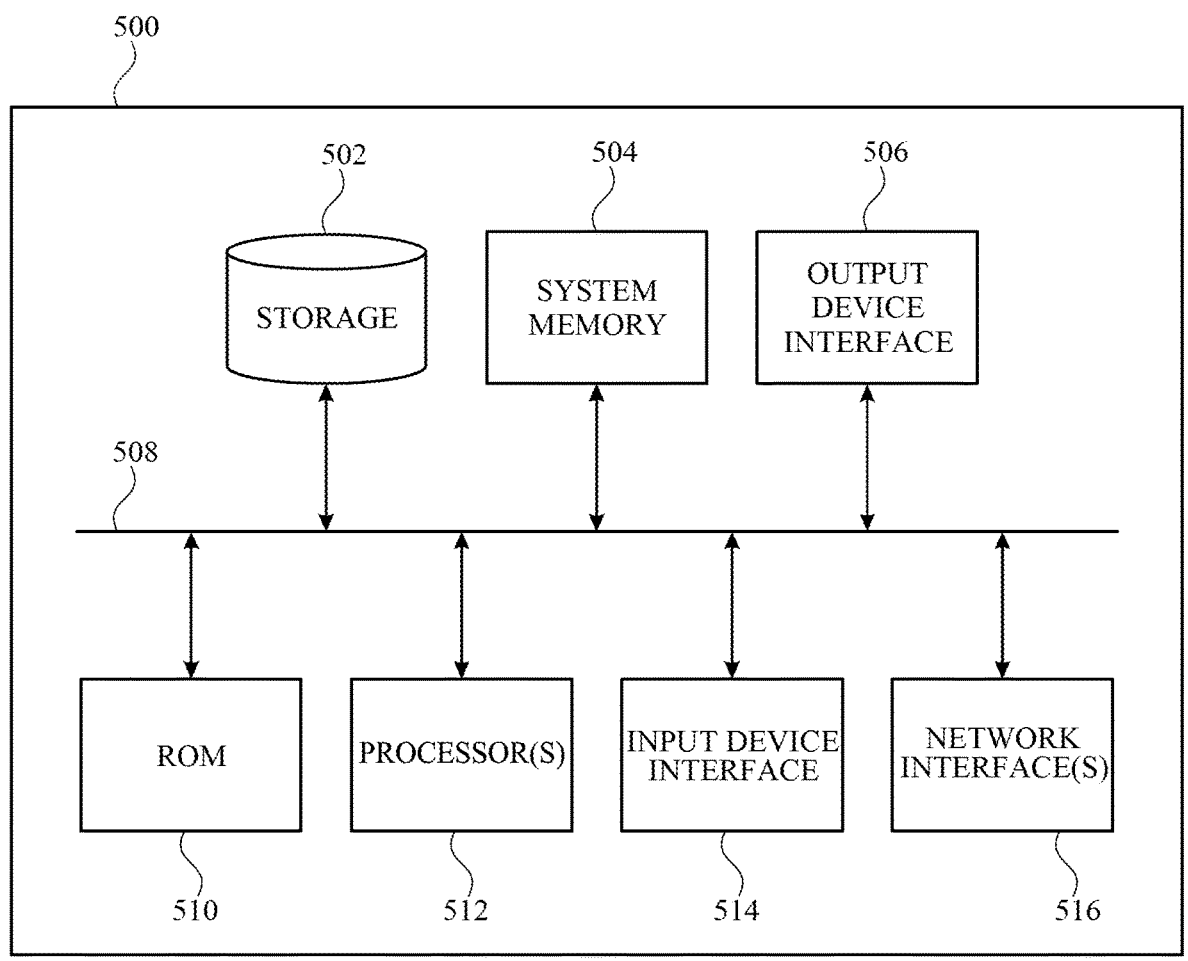
FIG. 5 illustrates an example of a computer system with which aspects of the subject technology may be implemented.

FIG. 5 illustrates an electronic system 500 with which one or more implementations of the subject technology may be implemented. The electronic system 500 can be, and/or can be a part of, server 110 and/or computing device 120 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the computing device 120 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized as computer program products comprising code in a tangible computer-readable storage medium (or multiple tangible computer-readable storage media of one or more types) encoding one or more instructions of the code. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or segmented in a different way) all without departing from the scope of the subject technology.

Aspects of the present technology may include the gathering and use of data available from specific and legitimate sources to train neural networks and to apply to trained neural networks deployed in systems. The present disclosure contemplates that in some instances, this gathered data may include personal information data that uniquely identifies or can be used to identify a specific person. Such personal information data can include meta-data or other data associated with images that may include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to train a neural network for better image classification performance. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of training data collection, the present technology can be configured to allow users to select to "opt in" or "opt out" of participation in the collection of personal information data during registration for services or anytime thereafter. In another example, users can select not to provide mood-associated data for use as training data. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, training data can be selected based on aggregated non-personal information data or a bare minimum amount of personal information, such as the content being handled only on the user's device or other non-personal information available to as training data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving an image comprising a plurality of channels;
executing a convolutional neural network model configured to generate a classification of the image, wherein executing the convolutional neural network model comprises:
executing convolution on each channel of the image by a depth-wise convolutional layer to generate first data comprising a plurality of channels; and
executing a linear transformation of the first data by a butterfly transform layer comprising a plurality of sub-layers to combine the plurality of channels of the first data to generate second data, wherein the classification is based on the generated second data; and
providing the classification of the image for further processing on a computing device.

2. The method of claim 1, wherein the plurality of sub-layers are configured to recursively calculate the second data.

3. The method of claim 1, wherein a number of input nodes and a number of output nodes for each of the plurality of sub-layers are equal.

4. The method of claim 3, wherein the butterfly transform layer comprises a path between each input node of a first sub-layer of the plurality of sub-layers that receives the first data and each output node of a second sub-layer of the plurality of sub-layers that outputs the second data.

5. The method of claim 1, wherein the butterfly transform layer is further configured to execute a non-linearity function on the generated second data.

6. The method of claim 1, wherein the butterfly transform layer is further configured to execute a batch normalization of the generated second data.

7. The method of claim 1, wherein all nodes within each sub-layer of the plurality of sub-layers have a same out degree.

8. The method of claim 1 wherein the plurality of sub-layers comprises log(n) sub-layers, wherein n is a number of channels of the image.

9. A system, comprising:
a processor; and
a memory device containing instructions which, when executed by the processor, cause the processor to:
receive an image comprising a plurality of channels;
execute a convolutional neural network model configured to generate a classification of the image, wherein executing the convolutional neural network model comprises:
executing convolution on each channel of the image by a depth-wise convolutional layer to generate first data comprising a plurality of channels; and
executing a linear transformation of the first data by a butterfly transform layer comprising a plurality of sub-layers to combine the plurality of channels of the first data to generate second data, wherein the classification is based on the generated second data;
execute a non-linearity function on the generated second data to generate the classification of the image; and
provide the a classification of the image for further processing on a computing device.

10. The system of claim 9, wherein the plurality of sub-layers are configured to recursively calculate the second data.

11. The system of claim 9, wherein a number of input nodes and a number of output nodes for each of the plurality of sub-layers are equal.

12. The system of claim 9, wherein the butterfly transform layer comprises a path between each input node of a first sub-layer of the plurality of sub-layers that receives the first data and each output node of a second sub-layer of the plurality of sub-layers that outputs the second data.

13. The system of claim 9, wherein the butterfly transform layer is further configured to execute a batch normalization of the generated second data.

14. The system of claim 9, wherein the plurality of sub-layers comprises log(n) sub-layers, wherein n is a number of channels of the image.

15. A computer program product comprising code stored in a non-transitory computer-readable storage medium, the code comprising:
code for receiving an image comprising a plurality of channels;
code for executing a convolutional neural network model configured to generate a classification of the image, wherein the code for executing the convolutional neural network model comprises:
code for executing convolution on each channel of the image by a depth-wise convolutional layer to generate first data comprising a plurality of channels; and
code for executing a linear transformation of the first data by a butterfly transform layer comprising a plurality of sub-layers to combine the plurality of channels of the first data to generate second data, wherein the butterfly transform layer comprises a path from each input node of the butterfly transform layer to each output node of the butterfly transform layer, and wherein the classification is based on the generated second data; and
code for providing the classification of the image for further processing on a computing device.

16. The computer program product of claim 15, wherein a number of input nodes and a number of output nodes for each of the plurality of sub-layers are equal.

17. The computer program product of claim 15, wherein the plurality of sub-layers are configured to recursively calculate the second data.

18. The computer program product of claim 15, wherein code for passing the first data through the butterfly transform layer further comprises code for executing a non-linearity function on the generated second data.

19. The computer program product of claim 15, wherein code for passing the first data through the butterfly transform layer further comprises code for normalizing the generated second data.

20. The computer program product of claim 16, wherein the plurality of sub-layers comprises log(n) sub-layers, wherein n is a number of channels of the image.

\* \* \* \* \*

UNITED STATES PATENT AND TRADEMARK OFFICE
CERTIFICATE OF CORRECTION

PATENT NO. : 12,079,727 B2  
APPLICATION NO. : 16/892192  
DATED : September 3, 2024  
INVENTOR(S) : Ali Farhadi et al.

Page 1 of 1

It is certified that error appears in the above-identified patent and that said Letters Patent is hereby corrected as shown below:

In the Claims

Column 14, Line 22 (Claim 9): "provide the a classification" should read --provide the classification--.

Signed and Sealed this
Twenty-sixth Day of November, 2024

Katherine Kelly Vidal
*Director of the United States Patent and Trademark Office*